United States Patent Office 3,646,145
Patented Feb. 29, 1972

3,646,145
N-(1-HYDROXY-1-PHENYL-ETHYL AMINO)-
PROPIOPHENONES
Kurt Thiele, Frankfurt am Main, Germany, assignor to
Deutsche Gold- und Silber-Scheideanstalt vormals
Roessler, Frankfurt am Main, Germany
No Drawing. Filed July 1, 1968, Ser. No. 741,283
Claims priority, application Germany, June 29, 1967,
P 15 93 837.1
Int. Cl. C07c 91/02
U.S. Cl. 260—570.5 C                              6 Claims

ABSTRACT OF THE DISCLOSURE

Compounds of the formula

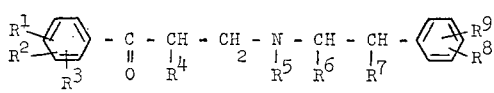

in which:

$R^1$ is fluorine, —CN, —COOH, —COOAlk, wherein Alk is lower alkyl, lower alkyl mercapto or lower alkyl sulfonyl;
$R^2$ and $R^3$ are each selected from the group consisting of hydrogen, chlorine, bromine, lower alkyl, lower alkoxy and hydroxy;
$R^4$ is hydrogen, methyl or ethyl;
$R^5$ is hydrogen or lower alkyl;
$R^6$ is hydrogen or lower alkyl;
$R^7$ is hydrogen or hydroxy and
$R^8$ and $R^9$ are hydrogen, halogen, lower alkyl, lower alkoxy or hydroxy
and their pharmacologically acceptable acid addition and quaternary ammonium salts which have heart activity, particularly in increasing coronary blood flow and contraction amplitude.

BACKGROUND OF THE INVENTION

Compounds of the formula

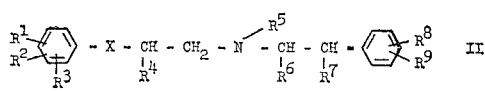

wherein:

X is —CO— or —CH(OH)—;
each of $R^1$, $R^2$ and $R^3$ is —H, —Cl, —NO$_2$, —OH or —OCH$_3$;
$R^4$ is —H, —CH$^3$, or —C$_2$H$_5$;
each of $R^5$ and $R^6$ is —H or —CH$_3$ and
each of $R^8$ and $R^9$ is —H, —Cl, —CH$_3$ or —OCH$_3$
which are suited for improvement of the heart function have been described in U.S. Pat. No. 3,225,095.

DESCRIPTION OF THE INVENTION
INCLUDING PREFERRED EMBODIMENTS

According to the invention it was found that compounds of the following formula, as well as their pharmacologically acceptable acid addition and quaternary ammonium salts

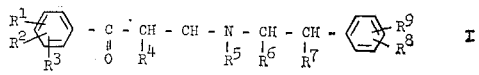

in which:

$R^1$ is fluorine, —CN, —COOH, —COOAlk, wherein Alk is lower alkyl, lower alkyl mercapto or lower alkyl sulfonyl;
$R^2$ and $R^3$ are each selected from the group consisting of hydrogen, chlorine, bromine, lower alkyl, lower alkoxy and hydroxy;
$R^4$ is hydrogen, methyl or ethyl;
$R^5$ is hydrogen or lower alkyl;
$R^6$ is hydrogen or lower alkyl;
$R^7$ is hydrogen or hydroxy and
$R^8$ and $R^9$ are hydrogen, halogen, lower alkyl, lower alkoxy or hydroxy also have valuable pharmacological properties, particularly for heart and circulatory conditions and especially those in which $R^1$ is as defined, $R^2$ and $R^3$ are hydrogen or lower alkoxy, $R^4$ and $R^5$ are hydrogen, $R^6$ is hydrogen or lower alkyl, $R^7$ is hydroxy and $R^8$ and $R^9$ are hydrogen or hydroxy also possess valuable properties in improving the heart function.

A more specific class of compounds within the invention is compounds of Formula I(a) below:

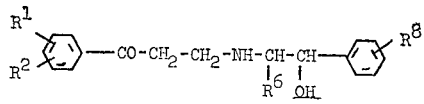

wherein $R^1$ is selected from the group consisting of F, lower alkyl mercapto and lower alkyl sulfonyl, $R^2$ is hydrogen or lower alkoxy, $R^6$ is hydrogen or methyl, and $R^8$ is hydrogen or hydroxy, and their pharmacologically acceptable acid addition salts.

For sake of simplicity in the following general description of the process for preparing the compounds according to the invention, the radical

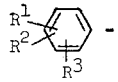

which also appears at the left end of the Formula I for the compounds according to the invention will be designated as Ph$^1$— and the radical

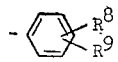

which also appears at the right end of such formula will be designated as —Ph$^2$.

The compounds according to the invention, for example, can be produced by:
(a) reacting a compound of the formula

with a compound of the formula

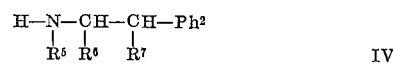

together with formaldehyde or a formaldehyde yielding substance;
(b) reacting a compound of the formula

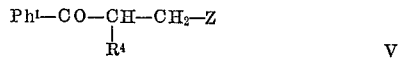

with a compound of the formula

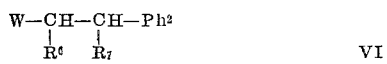

in which one of Z and W represents halogen and the other —NHR⁵, in the presence of a basic substance;

(c) reacting a compound of the formula

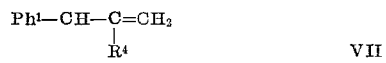

or the corresponding Mannich base

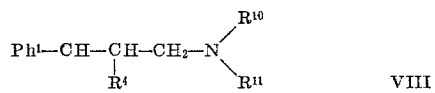

wherein $R^{10}$ and $R^{11}$ are lower alkyl with a compound of the Formula IV;

(d) reacting a compound of the formula

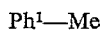

in which Me is alkali metal, —MgCl, —MgBr or —MgI with a compound of the formula

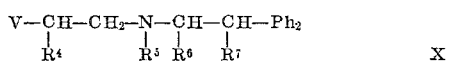

in which V is —CN or —COHal (Hal=Cl or Br).

In procedure (a) temperatures of 20 to 150° C. are usually employed. Solvents such as alcohols, dioxane, glacial acetic acid and the like come into consideration.

Procedure (b) is usually carried out at elevated temperatures, such as, for example, between 80 and 140° C., in a solvent such as an alcohol, ether, dimethyl formamide and the like. Alkali metal alcoholates, alkali metal amides, alkali metal carbonates and tertiary amines, for instance, come into consideration as the basic substances.

Procedure (c) when carried out with unsaturated ketone VII is generally carried out at temperatures between 20 and 80° C. in an inert solvent, such as, ether, acetone, dioxane or chloroform and when carried out with the corresponding Mannich base VIII, which during the reaction intermediately decomposes to the unsaturated ketone VII is generally carried out at 30 to 120° C. in a solvent such as water, alcohol/water or a two phase system such as water/benzene or water/toluene.

Procedure (d) is preferably carried out at temperatures between —20 and +80° C. Solvents, such as, ether, dioxane, tetrahydrofurane or benzene come into question.

The compounds according to the invention which contain optically active carbon atoms which usually are obtained as racemates can be separated into their optically active isomers or diastereomers by the normal methods. However, optically active isomers or diastereomers can also be used as starting materials.

The compounds according to the invention can be converted to their pharmacologically acceptable acid addition salts or quaternary ammonium salts with the aid of such pharmacologically acceptable acids such as acetic, succinic, maleic, fumaric, lactic, hydrochloric, hydrobromic, sulfuric, phosphoric acids or quaternizing compounds such as the lower alkyl halides.

Conversely, when the acid salts are produced as primary products, they may be converted to their free base by treatment with a base such as potassium carbonate.

The compounds according to the invention possess valuable pharmaceutical properties and are suited for the treatment of heart and circulatory conditions and especially for increasing the coronary blood flow in combination with an improvement in the heart function. The compounds were tested on the isolated guinea pig heart following the method of Langendorff (Pflüger's Arch. 61, 219, 1889) for their activity on coronary blood flow, contraction amplitude and heart frequency. Metabolism investigations on the Langendorff heart have also shown that the increase in contraction amplitude is accompanied by an increased production of energy supplying substrates and improved utilization of the latter. Their toxicity (LD 50 mg./kg. was tested on mice upon oral application by the method of Miller and Tainter (Proc. Soc. exper. Biol. a. Med. 57, 261, 1944).

The compounds according to the invention produce a moderate to strong dilation of the coronary system with a simultaneous increase in contraction amplitude in a dosage range of 10–500 μg. hear. They therefore are suited for improving the function of the heart muscle, as well as the blood flow through the heart muscle.

The administration of the compounds according to the invention is by the standard modes for administration of compounds which are active in improving coronary blood circulation, such as, for example, enteral, parenteral, oral or perlingual. The dosage rate upon intravenous administration to animals, for example, dogs, is in the range of about 0.5–50 mg./kg.

The following examples will serve to illustrate the compounds according to the invention.

EXAMPLE 1

1-3-[1-phenyl-1-hydroxy-propyl-(2)-amino]-1-(2-fluoro-phenyl)-propanone-(1)·HCl

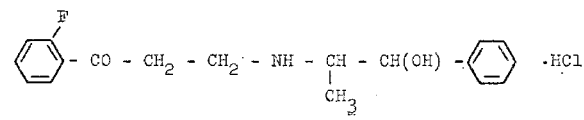

10 g. (0.072 mol) of 2-fluoro acetophenone, 13.6 g. (0.072 mol) of 1-norephedrine·HCl and 2.6 g. of paraformaldehyde (0.087 mol) were boiled under reflux for 4 hours in 50 ml. of isopropanol to which 2 drops of isopropanolic HCl had been added. Upon cooling the hydrochloride crystallized out. Yield 11 g., melting point 187–189° C. (recrystallized from methanol).

EXAMPLE 2

(a) 1-3-[1-phenyl-1-hydroxy-propyl-(2)-amino]-1-(3-fluoro-phenyl)-propanone-(1)·HCl 15.2 g. (0.11 mol) of 3-fluoro acetophenone, 15.1 g. (0.1 mol) of 1-norephedrine and 3.6 g. (0.12 mol) of paraformaldehyde were added to 50 ml. of isopropanol and the mixture adjusted to a pH of 4 by the addition of isopropanolic HCl and then boiled under reflux for 3 hours. Upon cooling the hydrochloride salt crystallized out. Yield 21 g., melting point 205–208° C. (recrystallized from methanol).

(b) 1-3-[1-phenyl-1-hydroxy-propyl-(2)-amino]-1-(4-fluoro-phenyl)-propanone-(1)·HCl was prepared analogously using 4-fluoro acetophenone as the starting material. Yield 16 g., melting point 203–206° C. (recrystallized from methanol).

EXAMPLE 3

1-3-[1-phenyl-1-hydroxy-propyl-(2)-amino]-1-(3-fluoro-4-methoxy-phenyl)-propanone-(1)·HCl

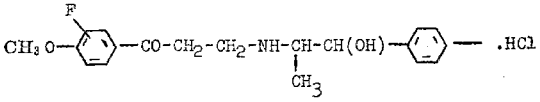

5 g. (0.03 mol) of 3-fluoro-4-methoxy acetophenone, 6.8 g. (0.036 mol) of 1-norephedrine·HCl and 1.8 g. (0.06 mol) of paraformaldehyde were boiled under reflux in 50 ml. of ethanol and 30 ml. of isopropanol in the presence of 2 drops of isopropanolic HCl whereby the hydrochloride salt precipitated out. Yield 5 g., melting point 216–217° C. (recrystallized from methanol)

EXAMPLE 4 d,1-3-(2-phenyl-2-hydroxy ethyl amino)-4-1-(fluoro-phenyl)-propanone-(1)

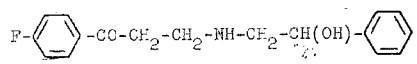

19.5 g. (0.0843 mol) of β-dimethylamino-4-fluoro propiophenone·HCl and 11.5 g. (0.0843 mol) of 2-phenyl-2-hydroxy ethyl amine were each dissolved in 100 ml. of water and after mixing warmed to 60° C. Upon cooling, 14 g. of the base (melting point 132–133° C.) precipitated out which was filtered off and washed with ether. The base was then slurried in 300 ml. of isopropanol and converted to the HCl salt with isopropanolic HCl. Yield 14 g., melting point 181–183° C. (recrystallized from ethanol).

EXAMPLE 5

1-3-[1-phenyl-1-hydroxy-propyl-(2)-amino]-1-(3-carboxy-phenyl)-propanone-(1)·HCl 14.5 g. (0.0884 mol) of 3-carboxy-acetophenone, 16.6 g. (0.0885 mol) of 1-norephedrine·HCl and 5.4 g. (0.18 mol) of paraformaldehyde were boiled in 70 ml. of isopropanol under reflux for one hour whereby the HCl salt precipitated out. Yield 9 g., melting point 208° C. (recrystallized from ethanol).

EXAMPLE 6

1-3-[1-phenyl-1-hydroxy-propyl-(2)-amino]-1-(3-cyano-phenyl)-propanone-(1)·HCl 5 g. (0.0345 mol) of 3-cyano-propiophenone, 6.5 g. (0.0348 mol) of 1-norephedrine·HCl and 1.5 g. (0.05 mol) of paraformaldehyde were reacted in 30 ml. of isopropanol as in Example 5. Yield 1.5 g. of the HCl salt, melting point 212° C. (recrystallized from ethanol).

EXAMPLE 7

1-3-[1-phenyl-1-hydroxy-propyl-(2)-amino]-1-(3-carbethoxy-phenyl)-propanone-(1)·HCl 8 g. (0.0416 mol) of 3-carbethoxy-acetophenone, 7.8 g. (0.0416 mol) of 1-norephedrine·HCl and 2.6 g. (0.0867 mol) of paraformaldehyde were boiled under reflux for 2 hours in 50 ml. of isopropanol. After the reaction solution cooled down acetone was added, whereupon the HCl salt precipitated out. Yield 2 g., melting point 202° C. (recrystallized from ethanol).

EXAMPLE 8

1-3-[1-phenyl-1-hydroxy-propyl-(2)-amino]-1-(4-methylmercapto-phenyl)-propanone-(1)·HCl 16.8 g. (0.1 mol) of 4-methylmercapto-acetophenone, 18.7 g. (0.1 mol) of 1-norephedrine·HCl and 6 g. (0.2 mol) of paraformaldehyde were reacted in 50 ml. of isopropanol as in Example 5. Yield 12 g. of the HCl salt, melting point 202–204° C. (recrystallized from methanol).

EXAMPLE 9

1-3-[1-phenyl-1-hydroxy-propyl-(2)-amino]-1-(4-methyl sulfonyl-phenyl)-propanone-(1)

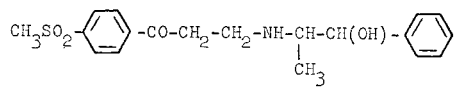

19.8 g. (0.1 mol) of 4-methyl sulfonyl-acetophenone, 18.7 g. (0.1 mole) of 1-norephedrine·HCl and 6 g. (0.2 mol) of paraformaldehyde were reacted in 50 ml. of isopropanol as in Example 5. Yield 17 g. of the HCl salt, melting point 219–220° C. (recrystallized from 80% ethanol).

EXAMPLE 10 d.l-3-[1,(4-hydroxy-phenyl(-1-hydroxy-propyl-(2)-amino]-1-(4-fluoro-phenyl)propanone-(1)·HCl 13.8 g. (0.1 mol) of 4-fluoro acetophenone, 6 g. (0.2 mol) of paraformaldehyde and 20.3 g. (0.1 mol) of d,l-p-hydroxy-norephedrine·HCl were heated under reflux for 6 hours in 100 ml. of ethanol. The solvent was distilled off and acetone then added to the residue to effect crystallization thereof. The hydrochloride salt was washed with water and recrystallized from isopropanol. Yield 2 g. of the HCl salt, melting point 115° C.

EXAMPLE 11 d,l-[1-(4-hydroxy-phenyl)-1-hydroxy-propyl-(2)-amino]-1-(3-cyano-phenyl)-propanone-(1)·HCl 20 g. (0.138 mole) of 3-cyano acetophenone, 7 g. (0.233 mole) of paraformaldehyde and 28.3 (0.139 mole) of d,l-p-hydroxy-norephedrine·HCl were heated under reflux for 2 hours in 220 ml. of isopropanol. The HCl salt which crystallized out on cooling was washed twice with acetone and twice with water and recrystallized from methanol. Yield 4 g. of the HCl salt, melting point 203° C.

I claim:
1. A compound having the formula

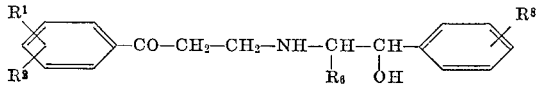

wherein $R^1$ is selected from the group consisting of F, lower alkyl mercapto and lower alkyl sulfonyl, $R^2$ is hydrogen or lower alkoxy, $R^6$ is hydrogen or methyl, and $R^8$ is hydrogen or hydroxy, and their pharmacologically acceptable acid addition salts.

2. A compoun according to claim 1 wherein $R^1$ is selected from the group consisting of lower alkyl mercapto and lower alkyl sulfonyl.

3. A compound according to claim 1 wherein $R^1$ is F, methyl mercapto or methyl sulfonyl, $R^2$ is hydrogen or methoxy.

4. A compound according to claim 1 wherein $R^1$ is F, $R^2$ is hydrogen, $R^6$ is methyl and $R^8$ is hydrogen.

5. A compound according to claim 1 wherein $R^1$ is F. $R^2$ is hydrogen, $R^6$ is methyl and $R^8$ is hydroxy.

6. A compound according to claim 1 wherein $R^1$ is F.

References Cited

UNITED STATES PATENTS

| | | | |
|---|---|---|---|
| 3,197,507 | 7/1965 | Freed et al. | 260—570.5 |
| 3,225,095 | 12/1965 | Thiele | 260—570.5 |
| 3,337,546 | 8/1967 | Malatestinic et al. | 260—570.5 X |
| 3,337,626 | 8/1967 | Thiele | 260—570.5 |

ROBERT V. HINES, Primary Examiner

U.S. Cl. X.R.

260—465 RE, 501.18, 515 R, 519, 544 R, 544 M, 567.6 M, 570.6, 592; 424—298, 304, 309, 329, 330